United States Patent Office 2,938,904
Patented May 31, 1960

2,938,904

COMPOUNDS DERIVED FROM HALONITROANTHRAQUINONES

William L. Mosby, North Plainfield, and William L. Berry, Neshanic, N.J., assignors to American Cyanamid Company, New York, N.Y., a corporation of Maine No Drawing. Filed Oct. 12, 1959, Ser. No. 845,620

3 Claims. (Cl. 260—272)

This invention relates to new polycyclic, heterocyclic compounds usable as vat dyes or pigments. More specifically, it relates to the new compounds of the structure

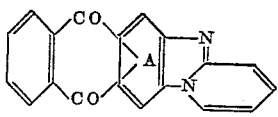

in which the carbonyls are linked with adjoining carbons of the ring A.

We have found that when 2-aminopyridines are heated with an ortho-nitrohaloanthraquinone, the resulting product is a pyridoimidazoloanthraquinone of the unique structure given above. We have further found that the compounds of our invention are excellent orange pigments and vat dyes.

The halonitroanthraquinones used as the starting materials for our invention are readily available by the peracetic acid oxidation of aminohaloanthraquinones which we have reported elsewhere (Tetrahedron, 5, 93 (1959)). As convenient starting materials, depending on whether a 1,2 or 2,3 configuration is desired, we prefer to use 1-chloro-2-nitroanthraquinone prepared from 1-chloro-2-aminoanthraquinone or 2-bromo-3-nitroanthraquinone prepared from 2-amino-3-bromoanthraquinone. Starting with 1-chloro-2-nitroanthraquinone one obtains the vat dye of the structure

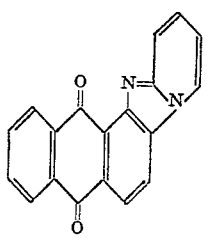

while 2-bromo-3-nitroanthraquinone produces the linear dye of the structure

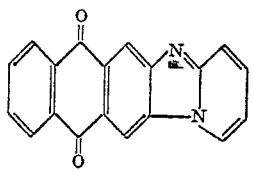

Both of these compounds of our invention are orange in color and dye cotton an orange shade from red vats. They are furthermore usable as orange coloring materials for resins, as well as for hydrocarbons such as gasoline.

The reaction between the halonitroanthraquinone and the 2-aminopyridine preferably takes place in solvents such as glycol diacetate.

Our invention can be illustrated by the following examples in which parts are by weight unless otherwise specified.

*Example 1*

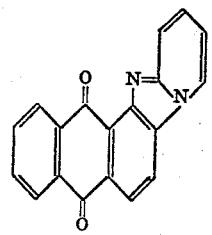

A mixture of 14.4 parts of 1-chloro-2-nitroanthraquinone, 4.7 parts of 2-aminopyridine, 0.02 part of cupric acetate and 100 parts by volume of glycol diacetate is stirred at reflux until the reaction is substantially complete. A dark solid deposit and nitric fumes are evolved. The mixture is cooled, and the solid is separated, washed with ethyl acetate and dried. The product is then subjected to sublimation in a vacuum to give orange needles which dye cotton an orange shade from a red vat.

*Example 2*

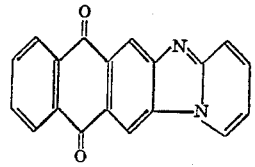

A mixture of 16.6 parts of 2-bromo-3-nitroanthraquinone, 14.1 parts of 2-aminopyridine and 0.4 part of cupric acetate in 100 parts by volume of glycol diacetate is stirred under reflux until the reaction is substantially complete. The cooled mixture is filtered and the brownish yellow solid is sublimed in a vacuum. The orange product can be recrystallized from trichlorobenzene. It dyes cotton an orange shade from a red vat.

*Example 3*

Five parts of the product of Example 1 is ground to a fine powder and added to 100 parts of polyvinylchloride being milled on a 3-roll mill. The polyvinylchloride is then milled with 50 parts of di-2-ethylhexylphthalate, 2 parts of barium cadmium laurate, and one part of a triarylphosphite. The composition is then molded in a standard way giving a sheet of polyvinylchloride having an orange color.

We claim:

1. A compound of the structure

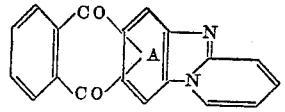

in which the carbonyls are linked with adjoining carbons of the ring A.

2. The compound of the structure
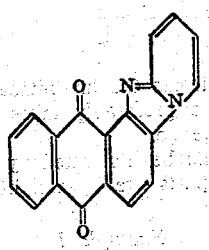
3. The compound of the structure
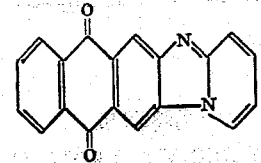
No references cited.